United States Patent
Cho (10) Patent No.: US 9,696,824 B2
(45) Date of Patent: Jul. 4, 2017

(54) ELECTRONIC DEVICE, INPUT DEVICE, AND METHOD FOR CONTROLLING ELECTRONIC DEVICE USING THE INPUT DEVICE

(71) Applicant: Samsung Electronics Co., Ltd., Suwon-si, Gyeonggi-do (KR)

(72) Inventor: Dong-Hyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 14/628,671

(22) Filed: Feb. 23, 2015

(65) Prior Publication Data

US 2015/0241992 A1 Aug. 27, 2015

(30) Foreign Application Priority Data

Feb. 24, 2014 (KR) .......................... 10-2014-0021186

(51) Int. Cl.
| | |
|---|---|
| *G06F 3/038* | (2013.01) |
| *G06F 1/26* | (2006.01) |
| *G06F 3/0354* | (2013.01) |
| *G06F 3/02* | (2006.01) |

(52) U.S. Cl.
CPC .............. *G06F 3/038* (2013.01); *G06F 1/266* (2013.01); *G06F 3/0202* (2013.01); *G06F 3/03545* (2013.01); *G06F 2200/1632* (2013.01)

(58) Field of Classification Search
CPC .................... G06F 2200/1632; G06F 3/03545
See application file for complete search history.

(56) References Cited

U.S. PATENT DOCUMENTS

| | | | | |
|---|---|---|---|---|
| 5,287,121 A | * | 2/1994 | Louis | G06F 3/03547 178/18.01 |
| 5,646,649 A | * | 7/1997 | Iwata | G06F 1/1626 345/169 |
| 6,681,333 B1 | * | 1/2004 | Cho | G06F 1/1626 345/179 |
| 7,825,914 B2 | * | 11/2010 | Huang | G06F 1/1626 345/156 |
| 8,890,855 B1 | * | 11/2014 | Lee | G06F 1/169 345/156 |

(Continued)

FOREIGN PATENT DOCUMENTS

| | | |
|---|---|---|
| CN | 202838218 U | 3/2013 |
| CN | 203232384 U | 10/2013 |

(Continued)

*Primary Examiner* — Dorothy Harris (74) *Attorney, Agent, or Firm* — Jefferson IP Law, LLP (57) ABSTRACT

An electronic device, an input device, and a method for controlling the electronic device using the input device are provided. The electronic device includes an input device sensor configured to detect mounting of an input device, a reception unit configured to receive a button input signal received from the input device mounted on the electronic device, and a controller configured to set a button portion provided in the input device as a button of the electronic device in response to a mounting of the input device on the electronic device, and to perform a function corresponding to the button input signal if the button input signal of the input device is received from the reception unit. Other embodiments are also possible.

20 Claims, 9 Drawing Sheets

(56) References Cited

U.S. PATENT DOCUMENTS

| | | | |
|---|---|---|---|
| 2003/0231168 A1* | 12/2003 | Bell | G06F 1/1613 345/173 |
| 2004/0100457 A1 | 5/2004 | Mandle | |
| 2004/0104888 A1* | 6/2004 | Yoon | G06F 3/038 345/156 |
| 2004/0135765 A1* | 7/2004 | Kinerk | G06F 1/1626 345/156 |
| 2004/0212586 A1* | 10/2004 | Denny, III | G06F 1/1626 345/156 |
| 2005/0073498 A1* | 4/2005 | Lehtonen | G06F 1/1626 345/161 |
| 2006/0044288 A1* | 3/2006 | Nakamura | G06F 1/1626 345/179 |
| 2008/0036747 A1* | 2/2008 | Hope | G06F 1/1626 345/179 |
| 2009/0149219 A1* | 6/2009 | Rhee | H04M 1/0285 455/557 |
| 2010/0248776 A1* | 9/2010 | Williams | G06F 1/1626 455/556.1 |
| 2011/0285671 A1* | 11/2011 | Wu | G06F 1/1626 345/179 |
| 2014/0078116 A1* | 3/2014 | Mercea | G06F 1/266 345/179 |
| 2014/0313171 A1* | 10/2014 | Hong | G06F 3/0227 345/184 |
| 2016/0054821 A1* | 2/2016 | Kim | G06F 3/03545 345/179 |

FOREIGN PATENT DOCUMENTS

| | | |
|---|---|---|
| JP | 11-327775 A | 11/1999 |
| KR | 10-2004-0073634 A | 8/2004 |
| WO | 2010/110815 A1 | 9/2010 |

\* cited by examiner

ELECTRONIC DEVICE, INPUT DEVICE, AND METHOD FOR CONTROLLING ELECTRONIC DEVICE USING THE INPUT DEVICE

CROSS-REFERENCE TO RELATED APPLICATION(S)

This application claims the benefit under 35 U.S.C. §119(a) of a Korean patent application filed on Feb. 24, 2014 in the Korean Intellectual Property Office and assigned Serial number 10-2014-0021186, the entire disclosure of which is hereby incorporated by reference.

TECHNICAL FIELD

The present disclosure relates to an electronic device, an input device, and a method for controlling the electronic device using the input device, and for example, to an electronic device that may be controlled using an input device mounted thereon, the input device, and a method for controlling the electronic device using the input device.

BACKGROUND

A user may separate a touch pen from an electronic device having the touch pen mounted thereon to perform various functions, for example, to perform a handwriting function using the touch pen or to control a screen of the electronic device.

However, when the touch pen is mounted on the electronic device, the touch pen is merely kept in the electronic device without executing a separate function.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that may be controlled using an input device mounted on the electronic device, the input device, and a method for controlling the electronic device using the input device.

In accordance with an aspect of the present disclosure, an electronic device is provided. The electronic device includes an input device sensor configured to detect mounting of an input device, a reception unit configured to receive a button input signal received from the input device mounted on the electronic device, and a controller configured to set a button portion provided in the input device as a button of the electronic device if the input device is mounted on the electronic device, and to perform a function corresponding to the button input signal if the button input signal of the input device is received from the reception unit.

In accordance with another aspect of the present disclosure, an input device is provided. The input device includes a button portion configured to be set and used as a button of an electronic device when the input device is mounted on the electronic device and a transmission unit configured to transmit a button input signal received from the button portion to the electronic device.

In accordance with still another aspect of the present disclosure a method for controlling an electronic device using an input device is provided. The method includes setting a button portion provided in the input device as a button of the electronic device, if detecting mounting of the input device on the electronic device and performing a function corresponding to a button input signal, upon receiving the button input signal from the input device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure may be a device having a communication function. For example, the electronic device may be a combination of one or more of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, mobile medical equipment, an electronic bracelet, an electronic necklace, an electronic appcessory, a camera, a wearable device, an electronic clock, a wrist watch, home appliances (e.g., refrigerator, an air conditioner, a vacuum cleaner, an oven, a microwave oven, a laundry machine, an air cleaner, and/or the like), an artificial intelligence robot, a Television (TV), a Digital Video Disk (DVD) player, audio equipment, various medical equipment (e.g., Magnetic Resonance Angiography (MRA), Magnetic Resonance Imaging (MRI), Computed Tomography (CT), an imaging device, or an ultrasonic device), a navigation system, a Global Positioning System (GPS) receiver, an Event Data Recorder (EDR), a Flight Data Recorder (FDR), a set-top box, a TV box (e.g., Samsung HomeSync™, Apple TV™, or Google TV™, an electronic dictionary, a vehicle infotainment device, electronic equipment for ship (e.g., ship navigation system and gyro compass), avionics, a security device, an electronic clothing, an electronic key, a camcorder, a game console, a Head-Mounted Display (HMD), a flat panel display device, an electronic frame, an electronic album, a part of a furniture or building/structure having a communication function, an electronic board, an electronic signature receiving device, a wearable device, or a projector. It may be obvious to those of ordinary skill in the art that the electronic device according to various embodiments of the present disclosure is not limited to the foregoing devices.

According to various embodiments of the present disclosure, a touch pen is described as an example of an input device. However, the present disclosure may be equally applied to any device that may be mounted on and removed from an electronic device and may be used as an input device of the electronic device, like the touch pen.

Figure 1:
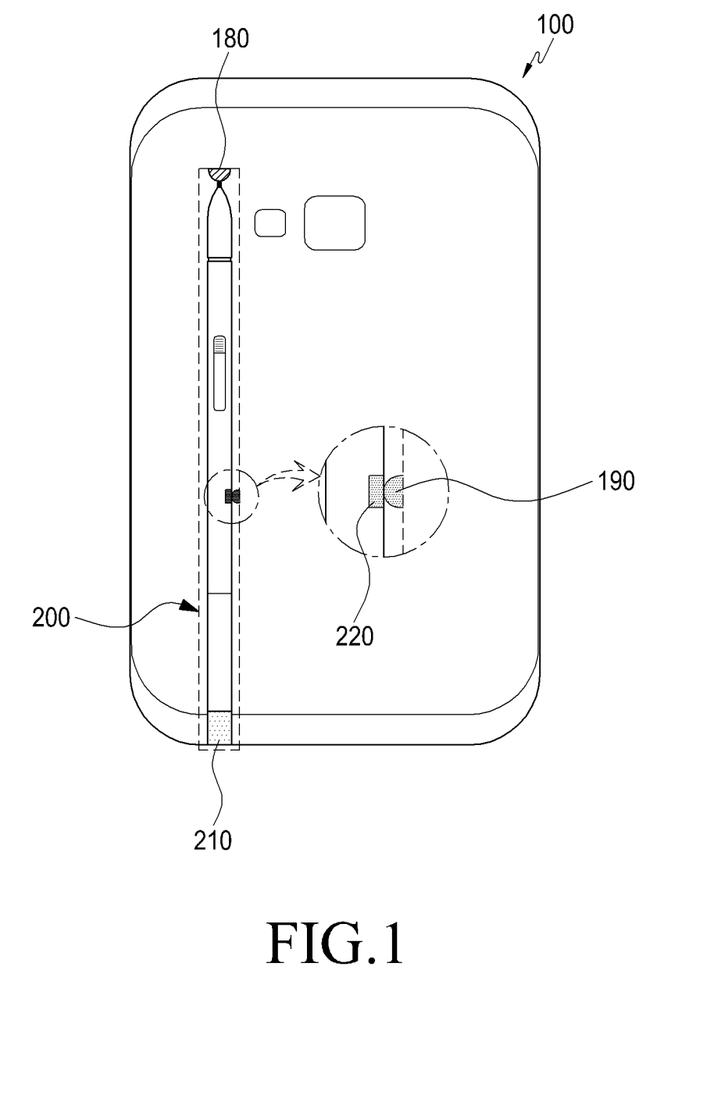
FIG. 1 is a diagram illustrating an electronic device on which a touch pen is mounted according to an embodiment of the present disclosure.

FIG. 1 is a diagram illustrating an electronic device having a touch pen mounted thereon according to an embodiment of the present disclosure.

Referring to FIG. 1, if mounting of a touch pen 200 on an electronic device 100 is detected, the electronic device 100 sets a button portion 210 provided on the touch pen 200 as a button of the electronic device 100.

The electronic device 100 may include a reception terminal 190 as a reception unit for receiving a button input signal from the touch pen 200. The reception unit 190 may be formed of a metallic material. Upon receiving a button input signal from the touch pen 200 mounted on the electronic device 100 through the reception terminal 190, the electronic device 100 performs a function corresponding to the button input signal.

The touch pen 200, when being mounted on the electronic device 100, may include the button portion 210 in an end portion thereof where the touch pen 200 is exposed. The touch pen 200, when mounted on the electronic device 100, may include a transmission terminal 220 as a transmission unit connected with the reception terminal 190 of the electronic device 100. The transmission terminal 220 may be formed of a metallic material or another material with which an electronic signal may be transmitted. When the touch pen 200 is mounted on the electronic device 100, the touch pen 200 transmits a button input signal generated from the button portion 210 to the electronic device 100 through the transmission terminal 220.

The structures of the electronic device 100 and the input device 200 as illustrated in FIG. 1 will be described in detail with reference to FIGS. 2A and 2B.

Figure 2A:
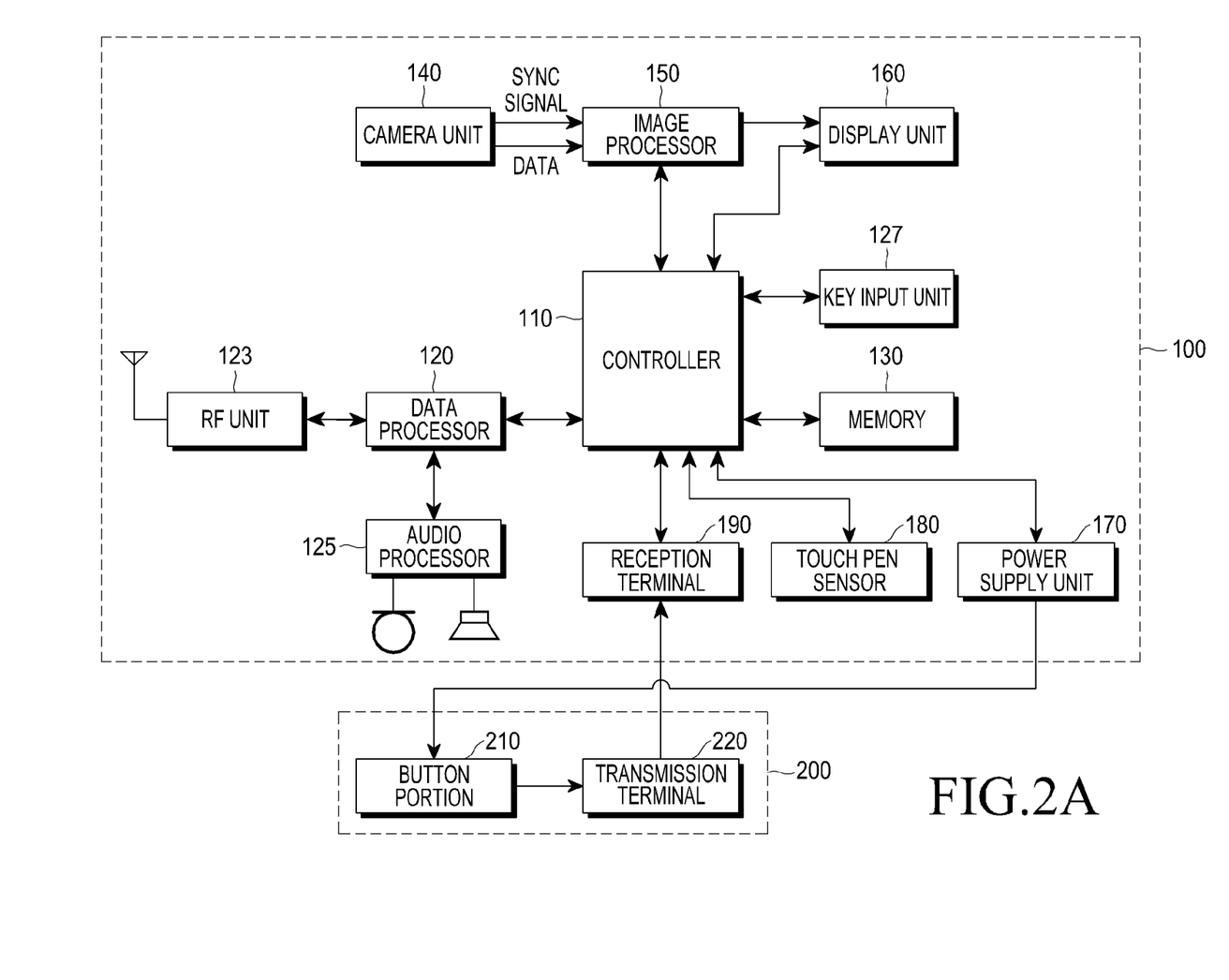
FIGS. 2A and 2B are block diagrams illustrating an electronic device and an input device according to an embodiment of the present disclosure.
Figure 2B:
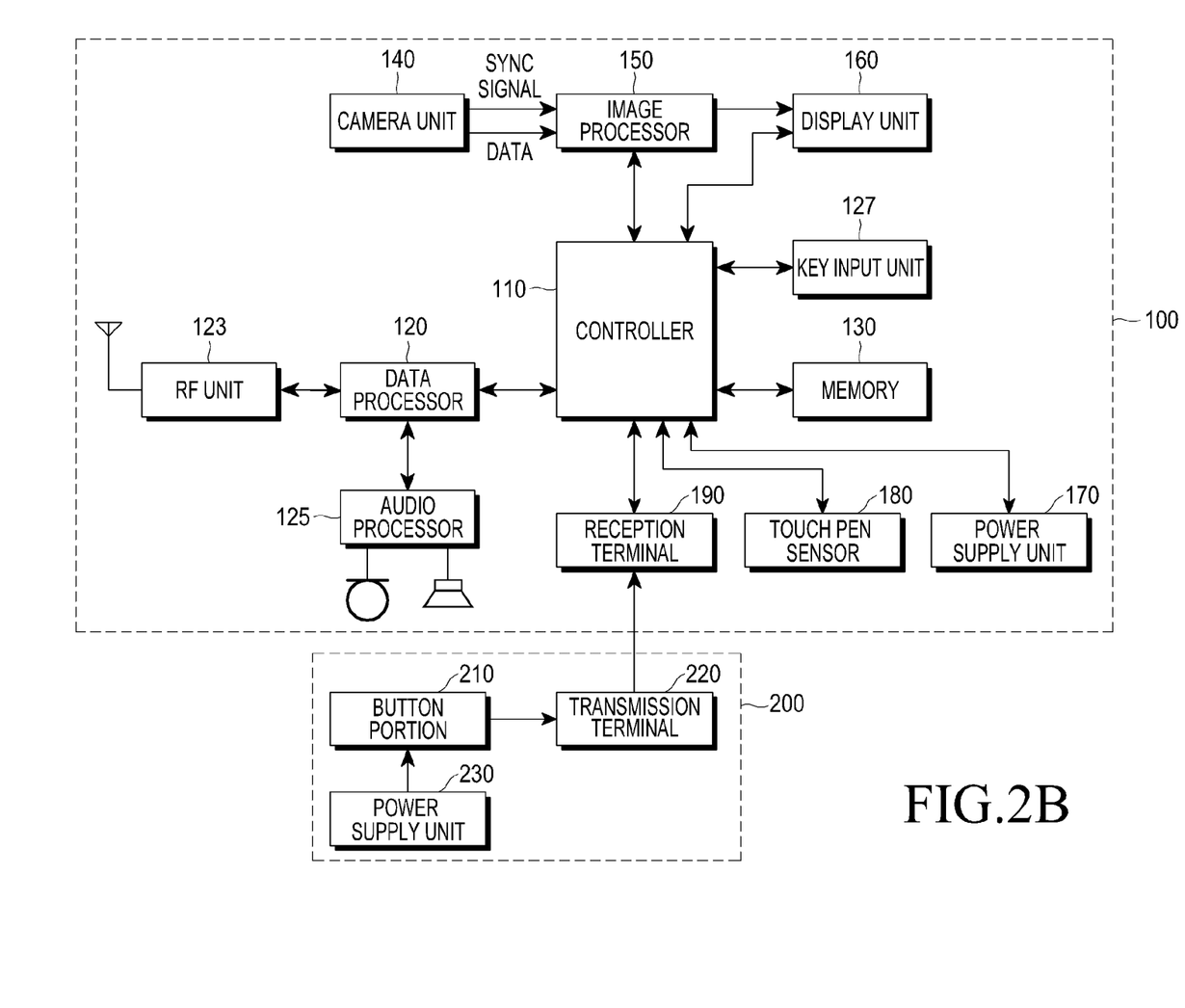

FIGS. 2A and 2B are block diagrams illustrating an electronic device and an input device according to an embodiment of the present disclosure.

FIG. 2A illustrates the electronic device 100 and the touch pen 200 that does not include a power supply unit.

Referring to FIG. 2A, the electronic device 100 may include a Radio Frequency (RF) unit 123, a data processor 120, an audio processor 125, a key input unit 127, a memory 130, a controller 110, a camera unit 140, an image processor 150, a display unit 160, a power supply unit 170, a touch pen sensor 180, and the reception terminal 190.

The RF unit 123 performs a wireless communication function of the electronic device 100. The RF unit 123 may include an RF transmitter for up-converting a frequency of a transmission signal and amplifying the up-converted transmission signal, and an RF receiver for low-noise-amplifying a received signal and down-converting a frequency of the low-noise-amplified signal.

The data processor 120 may include a transmitter for encoding and modulating the transmission signal and a receiver for demodulating and decoding the received signal. For example, the data processor 120 may include a modem.

The audio processor 125 plays an audio signal being output from the audio codec of the data processor 120 or transmits an audio signal generated from a microphone to the audio codec of the data processor 120.

The key input unit 127 includes keys for inputting numeric and character information and function keys for setting various functions, and may be a touch screen, a capacitive touch panel, a resistive touch panel, and/or the like for a software key input as well as for a hardware key input, or a hardware device for detecting a hovering input or a pen input.

The memory 130 may include program and data memories. The program memory stores programs for controlling general operations of the electronic device 100 and programs for controlling a button portion 210 of the touch pen 200 mounted on the electronic device 100 to be set and used as a button of the electronic device 100. The data memory temporarily stores data generated during execution of the programs.

According to various embodiments of the present disclosure, in the memory 130, a function that may be executed depending on a mode type (e.g., a standby mode, a call mode, a message mode, a music play mode, a web browsing, and/or the like) of the electronic device 100 upon reception of the button input signal from the touch pen 200 may be set and stored in advance.

The controller 110 performs a function of controlling overall operations of the electronic device 100.

According to various embodiments of the present disclosure, in response to the touch pen 200 being mounted on the electronic device 100, the controller 110 sets the button portion 210 provided in the touch pen 200 as a button of the electronic device 100. Upon receiving the button input signal of the touch pen 200 through the reception terminal 190 connected with the transmission terminal 200 of the touch pen 200, the controller 110 performs a function corresponding to the button input signal. According to various embodiments of the present disclosure, upon receiving a mounting sensing signal indicating mounting of the touch pen 200 from the touch pen sensor 180, the controller 110 supplies power to the button portion 210 of the touch pen 200 through the power supply unit 170.

The camera unit 140 may include a camera sensor that captures image data and converts a captured optical signal into an electric signal, and a signal processor that converts an analog image signal captured from the camera sensor into digital data. Herein, the camera sensor may be assumed to be a Charge Coupled Diode (CCD), Complementary Metal Oxide Semiconductor (CMOS) sensor, and/or the like, and the signal processor may be implemented with a Digital Signal Processor (DSP), and/or the like. The camera sensor and the signal processor may be implemented integrally or separately.

The image processor 150 performs Image Signal Processing (ISP) for displaying image signals output from the camera unit 140 on the display unit 160, and the ISP performs functions such as gamma correction, interpolation, spatial variation, image effects, image scaling, Automatic White Balance (AWB), Automatic Exposure (AE), Automatic Focusing (AF), and/or the like. The image processor 150 processes the image signals output from the camera unit 140 on a frame basis, and outputs the frame-based image data according to the characteristics and size of the display unit 160. The image processor 150, which includes a video codec, compresses frame image data displayed on the display unit 160 by preset coding, and restores (or decompresses) the compressed frame image data into its original frame image data. The video codec may include a Joint Photographic Experts Group (JPEG) codec, Moving Picture Experts Group (MPEG)-4 codec, Wavelet codec, and/or the like. The image processor 150 may be assumed to include an On-Screen Display (OSD) function, and the controller 110 may control the image processor 150 to output OSD data according to the size of a screen on which the data is displayed.

The display unit 160 may be implemented with a Liquid Crystal Display (LCD), and/or the like. The display unit 160 may control an LCD controller, a memory for storing image data, and an LCD display element. For example, if the LCD (e.g., the display unit 160) is implemented with a touch screen, the LCD may operate as an input unit, and in this case, the display unit 160 may display the alphanumeric keys of the key input unit 127. If the display unit 160 is used as a touch screen unit when the display unit 160 is implemented with the touch screen, the touch screen unit is configured with a sensor for detecting a touch to the touch screen. For example, the touch screen may be configured with a Touch Screen Panel (TSP) including a plurality of sensor panels that include a capacitive sensor panel capable of recognizing a hand touch and an electro-magnetic induction sensor panel capable of detecting a fine touch such as a touch pen, and/or the like. According to various embodiments of the present disclosure, the display unit 160 may inform a user that an additional button is set when (e.g., in response to) the touch pen 200 is mounted on the electronic device 100.

The power supply unit 170 supplies power to components of the electronic device 100. According to various embodiments of the present disclosure, if the touch pen 200 that does not include a power supply unit is mounted on the electronic device 100, the power supply unit 170 supplies power to the button portion 210 of the touch pen 200 to generate a signal indicating input of the button portion 210 of the touch pen 200, under control of the controller 110.

The touch pen sensor 180 detects the touch pen 200 mounted on or separated from the electronic device 100. The touch pen sensor 180 transmits a mounting sensing signal indicating mounting of the touch pen 200 on the electronic device 100 to the controller 110 when (e.g., in response to) the touch pen 200 is mounted on the electronic device 100. The touch pen sensor 180 transmits a separation sensing signal indicating separation of the touch pen 200 from the electronic device 100 to the controller 110 when (e.g., in response to) the touch pen 200 is separated from the electronic device 100.

The reception terminal 190 is connected with the transmission terminal 200 of the touch pen 200 if the touch pen 200 is mounted on the electronic device 100. The reception terminal 190 transmits a button input signal received from the transmission terminal 220 of the touch pen 200 to the controller 110.

The touch pen 200 may include the button portion 210 and the transmission terminal 220.

The button portion 210 may be provided in an end portion of the touch pen 200 at which the touch pen 200 is exposed when being mounted on the electronic device 100.

The structure of the button portion 210 of the touch pen 200 will be described in detail with reference to FIGS. 3A and 3B.

Figure 3A:
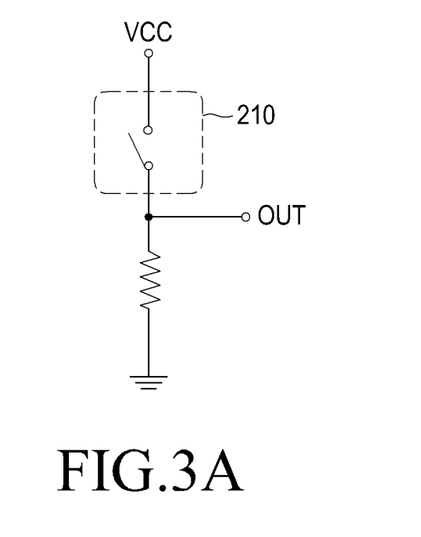
FIGS. 3A and 3B are circuit diagrams of a button portion provided in an input device according to an embodiment of the present disclosure.
Figure 3B:
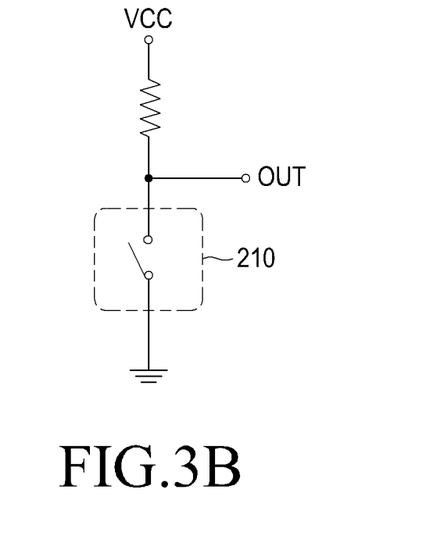

FIGS. 3A and 3B are circuit diagrams of a button portion provided in an input device according to an embodiment of the present disclosure. For example, FIGS. 3A and 3B are circuit diagrams of the button portion 210 provided in the input device 200.

Referring to FIG. 3A, the button portion 210 may be configured using a pull-down resistor. If the button portion 210 of the touch pen 200 mounted on the electronic device 100 is input by the user, a switch of the button portion 210 enters an on state. Upon the switch of the button portion 210 entering the on state, current supplied from the power supply unit 170 of the electronic device 100 is received through a VCC, and the button portion 210 outputs a high ("1") signal to the transmission terminal 220 based on the current received through the VCC.

Referring to FIG. 3B, the button portion 210 may include a pull-up resistor. If the button portion 210 of the touch pen 200 mounted on the electronic device 100 is input by the user, the switch of the button portion 210 enters an off state. Upon the switch of the button portion 210 entering the off state, current supplied from the power supply unit 170 of the electronic device 100 is received through the VCC, and the button portion 210 outputs a high ("1") signal to the transmission terminal 220 based on the current received through the VCC.

The transmission terminal 220 is connected in a contact manner with the reception terminal 190 of the electronic device 100 when the touch pen 200 is mounted on the electronic device 100. The transmission terminal 220 is connected with the button portion 210 to transmit the button input signal received from the button portion 210 to the reception terminal 190 of the electronic device 100.

FIG. 2B illustrates the electronic device 100 and the touch pen 200 that has a power supply unit for power supply thereto according to an embodiment of the present disclosure.

Referring to FIG. 2B, the electronic device 100 may include the RF unit 123, the data processor 120, the audio processor 125, the key input unit 127, the memory 130, the controller 110, the camera unit 140, the image processor 150, the display unit 160, the power supply unit 170, the touch pen sensor 180, and the reception terminal 190.

The RF unit 123, the data processor 120, the audio processor 125, the key input unit 127, the memory 130, the camera unit 140, the image processor 150, the display unit 160, the power supply unit 170, the touch pen sensor 180, and the reception terminal 190 are the same as those of the electronic device 100 illustrated in FIG. 2A, and thus will not be described herein.

The controller 110 performs a function of controlling overall operations of the electronic device 100.

According to various embodiments of the present disclosure, the controller 110 sets the button portion 210 provided in the touch pen 200 as a button of the electronic device 100 when (e.g., in response to) the touch pen 200 is mounted on the electronic device 100. The controller 110, upon receiving the button input signal of the touch pen 200 through the reception terminal 190 connected with the transmission terminal 220 of the touch pen 200, performs a function corresponding to the button input signal.

The power supply unit 170 supplies power to the components of the electronic device 100.

The touch pen 200 may include the button portion 210, the transmission terminal 220, and a power supply unit 230. The button portion 210 and the transmission terminal 220 are the same as those of the touch pen 200 illustrated in FIG. 2A, and thus will not be described herein.

According to various embodiments of the present disclosure, the power supply unit 230 may be provided in the touch pen 200. The power supply unit 230 may be charged with power through a charging device to be connected with the touch pen 200, such that the charged power may be supplied to the button portion 210 of the touch pen 200. The button portion 210 may be configured with a circuit as illustrated in FIG. 3A or 3B, and the power supply unit 230 of the touch pen 200 supplies current to the button portion 210 through the VCC. The power supply unit 230 supplies power to the button portion 210 regardless of mounting or separation of the touch pen 200. Upon the touch pen 200 being mounted on the electronic device 100, the power supply unit 230 supplies power to the button portion 210, under control of the controller 110 of the electronic device 100.

An operation of using the button portion 210 of the touch pen 200 as a button of the electronic device 100 by using the electronic device 100 and the touch pen 200 structured as illustrated in FIGS. 2A and 2B will be described in detail with reference to FIG. 4.

Figure 4:
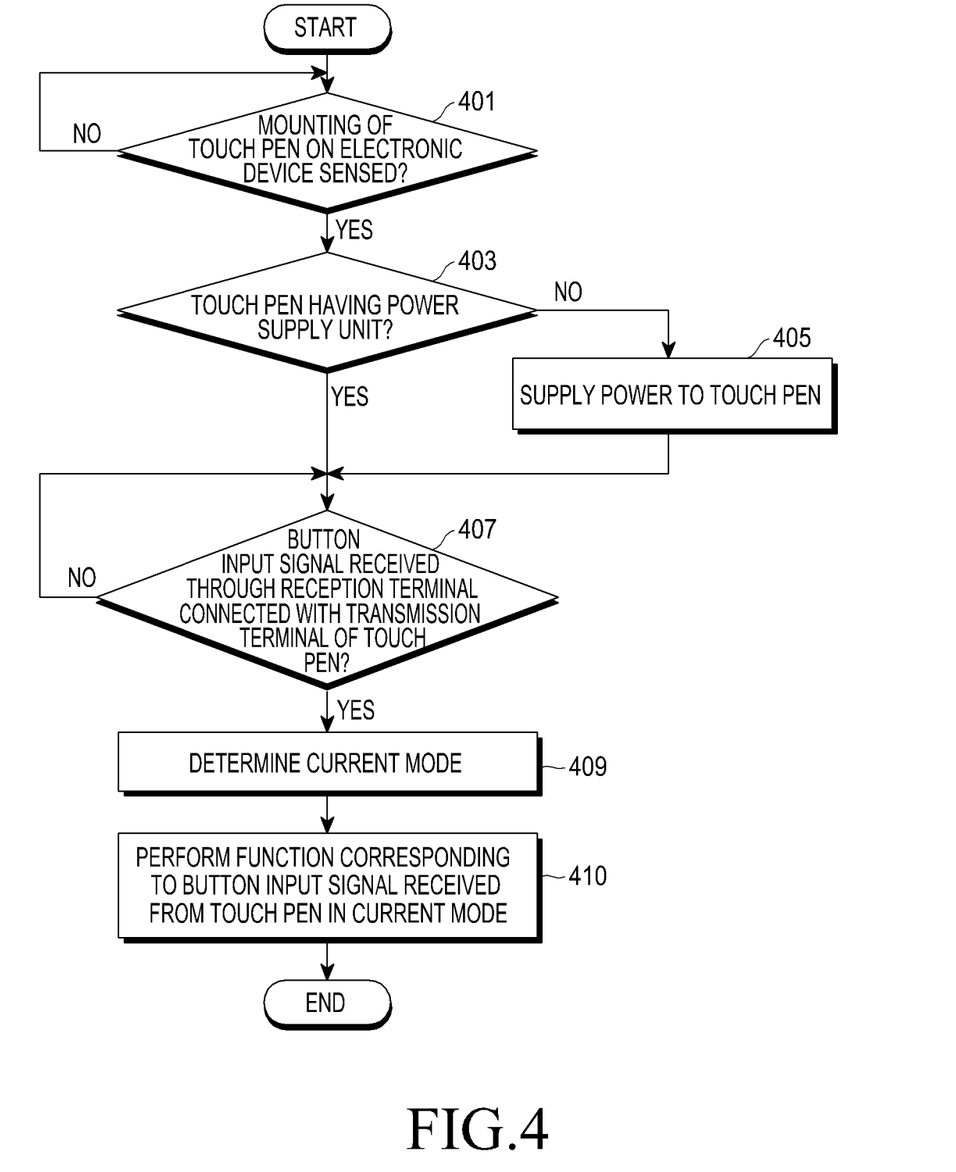
FIG. 4 is a flowchart illustrating an operation of using a button portion of a touch pen in an electronic device as a button of the electronic device according to an embodiment of the present disclosure.

FIG. 4 is a flowchart illustrating an operation of using a button portion of a touch pen in an electronic device as a button of the electronic device according to an embodiment of the present disclosure. For example, FIG. 4 is a flowchart illustrating an operation of using the button portion 210 of the touch pen 200 in the electronic device 100 as a button of the electronic device 100.

Referring to FIG. 4, at operation 401, the electronic device 100 determines whether a mounting of the touch pen 200 is detected. For example, upon the touch pen 200 being mounted on the electronic device 100, the touch pen sensor 180 detects mounting and transmits a mounting sensing signal indicating a mounting of the touch pen 200 to the controller 110. Upon receiving the mounting sensing signal from the touch pen sensor 180, the controller 110 detects mounting of the touch pen 200 on the electronic device 100.

If the electronic device 100 determines that the mounting of the touch pen 200 is not detected at operation 401, then the electronic device 100 may poll for an indication that the touch pen 200 is mounted to the electronic device 100.

In contrast, if the electronic device 100 determines that the mounting of the touch pen 200 is detected at operation 401, then the electronic device 100 may proceed to operation 403 at which the controller 110 determines whether a power supply unit is included in the touch pen 200 mounted on the electronic device 100. According to various embodiments of the present disclosure, the electronic device 100 may determine whether a mounted touch pen 200 includes a power supply unit according to the mounting sensing signal detected in response to the touch pen 200 being mounted to the electronic device 200. According to various embodiments of the present disclosure, if the touch pen 200 having the power supply unit is mounted on the electronic device 100, then the touch pen sensor 180 of the electronic device 100 receives a particular power value from the power supply unit of the touch pen 200. Thus, the touch pen sensor 180 transmits to the controller 110, a mounting sensing signal that is different from that transmitted when mounting of the touch pen 200 having no power supply unit is detected.

If the electronic device 100 (e.g., the controller 110) determines that the touch pen 200 mounted on the electronic device 100 does not include a power supply unit at operation 403, then the electronic device 100 may proceed to operation 405 at which the electronic device 100 may supply power to the touch pen 200. For example, if the electronic device 100 receives a first mounting sensing signal indicating that the touch pen 200 mounted on the electronic device 100 does not include the power supply unit as illustrated in FIG. 2A, then the controller 110 supplies power to the button portion 210 of the touch pen 200 at operation 405. Thereafter, the electronic device may proceed to operation 407. At operation 407, the controller 110 waits for receiving a button input signal from the touch pen 200.

If the electronic device 100 (e.g., the controller 110) determines that the touch pen 200 mounted on the electronic device 100 includes a power supply unit at operation 403, then the electronic device 100 may proceed to operation 407 at which the controller 110 waits for receiving a button input signal from the touch pen 200. For example, if the electronic device 100 (e.g., the controller 110) receives a second mounting sensing signal indicating that the touch pen 200 mounted on the electronic device 100 has the power supply unit as illustrated in FIG. 2b and thus is supplied with power therein at operation 403, then the controller 110 waits for receiving a button input signal from the touch pen 200 at operation 407. Upon the touch pen 200 being mounted on the electronic device 100, the reception terminal 190 of the electronic device 100 is connected in a contact manner with the transmission terminal 220 of the touch pen 200.

At operation 407, the electronic device 100 determines whether a button input signal is received from the touch pen 200. For example, the electronic device 100 determines whether a button input signal is received through a reception terminal 190 of the electronic device 100 that is connected with a transmission terminal 220 of the touch pen 200.

According to various embodiments of the present disclosure, if the button portion 210 of the touch pen 200 having been mounted on the electronic device 100 is input by the user, then the button portion 210 generates a button input signal that is then transmitted to the reception terminal 190 through the transmission terminal 220. The reception terminal 190 of the electronic device 100 having received the button input signal from the transmission terminal 220 of the touch pen 200 delivers the button input signal to the controller 110.

If the electronic device 100 determines that a button input signal is not received from the touch pen 200 at operation 407, then the electronic device 100 may continue to poll for reception of a button input signal. For example, if the controller 110 determines that a button input signal is not received from the reception terminal 190 at operation 407, then the controller 110 may continue to poll for reception of a button input signal.

If the electronic device 100 determines that a button input signal is received from the touch pen 200 at operation 407, then the electronic device 100 may proceed to operation 409 at which the electronic device 100 determines a current mode. For example, upon receiving the button input signal from the reception terminal 190 at operation 407, the controller 110 determines a current mode of the electronic device 100 at operation 409.

At operation 410, the electronic device 100 performs a function corresponding to the button input signal received from the touch pen 200 in the current mode. For example, at operation 410, the controller 110 detects and determines a function corresponding to the button input signal, which has been preset for the current mode of the electronic device 100, from the memory 130. At operation 410, the controller 110 performs the detected function corresponding to the button input signal.

Figure 5:
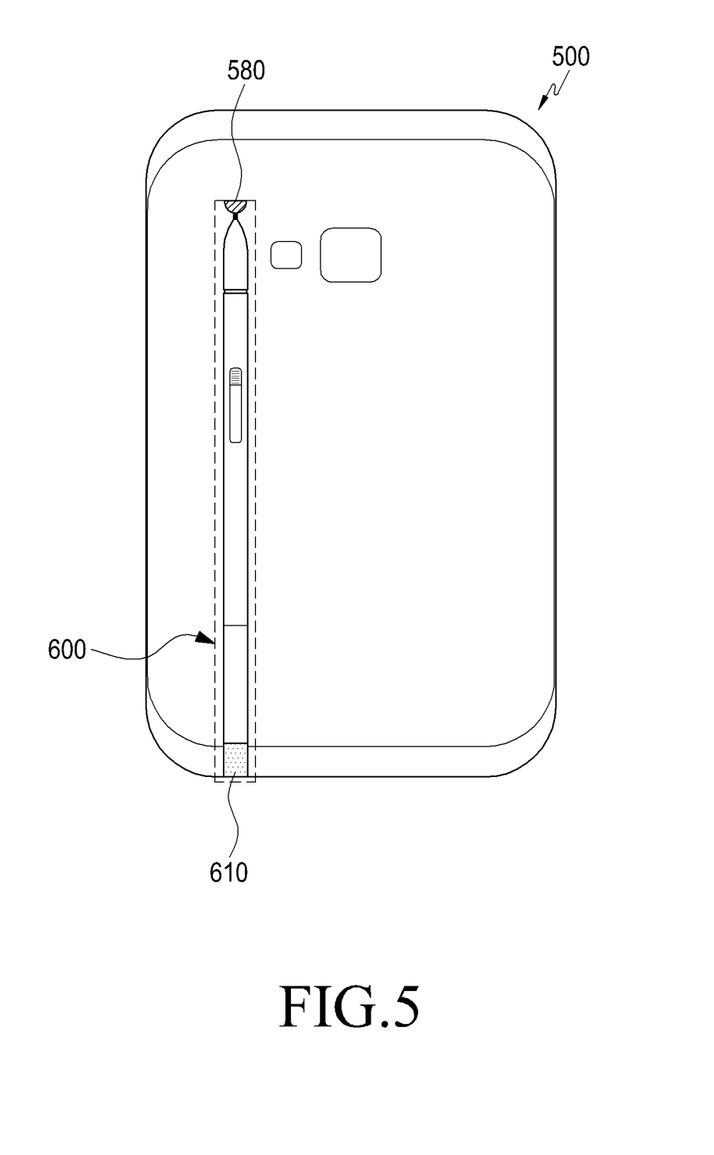
FIG. 5 is a diagram illustrating an electronic device having a touch pen mounted thereon according to an embodiment of the present disclosure.

FIG. 5 illustrates an electronic device having mounted a touch pen thereon according to an embodiment of the present disclosure.

Referring to FIG. 5, if mounting of a touch pen 600 on an electronic device 500 is detected, a button portion 610 provided on the touch pen 600 may be additionally set as a button of the electronic device 500.

The electronic device 500 may include a first communication unit as a reception unit for receiving a button input signal from the touch pen 600 mounted on the electronic device 500. The first communication unit may include a short-range communication unit such as Bluetooth communication, infrared communication, Near Field Communication (NFC), and/or the like. Upon receiving the button input signal from the touch pen 600 mounted on the electronic device 500 through the first communication unit, the electronic device 500 performs a function corresponding to the button input signal.

If the touch pen 600 is mounted on the electronic device 500, then the touch pen 600 may include a button portion 610 in an end portion thereof at which the touch pen 600 is exposed. The touch pen 600 may include a second communication unit as a transmission unit for connecting communication with the first communication unit of the electronic device 500 when the touch pen 600 is mounted on the electronic device 500. The second communication unit may include a short-range communication unit such as Bluetooth communication, infrared communication, Near Field Communication (NFC), and/or the like. If the touch pen 600 is mounted on the electronic device 500, then the touch pen 600 transmits a button input signal generated from the button unit 610 to the electronic device 500 through the second communication unit.

The structures of the electronic device 500 and the touch pen 600 illustrated in FIG. 5 will be described in detail with reference to FIGS. 6A and 6B.

Figure 6A:
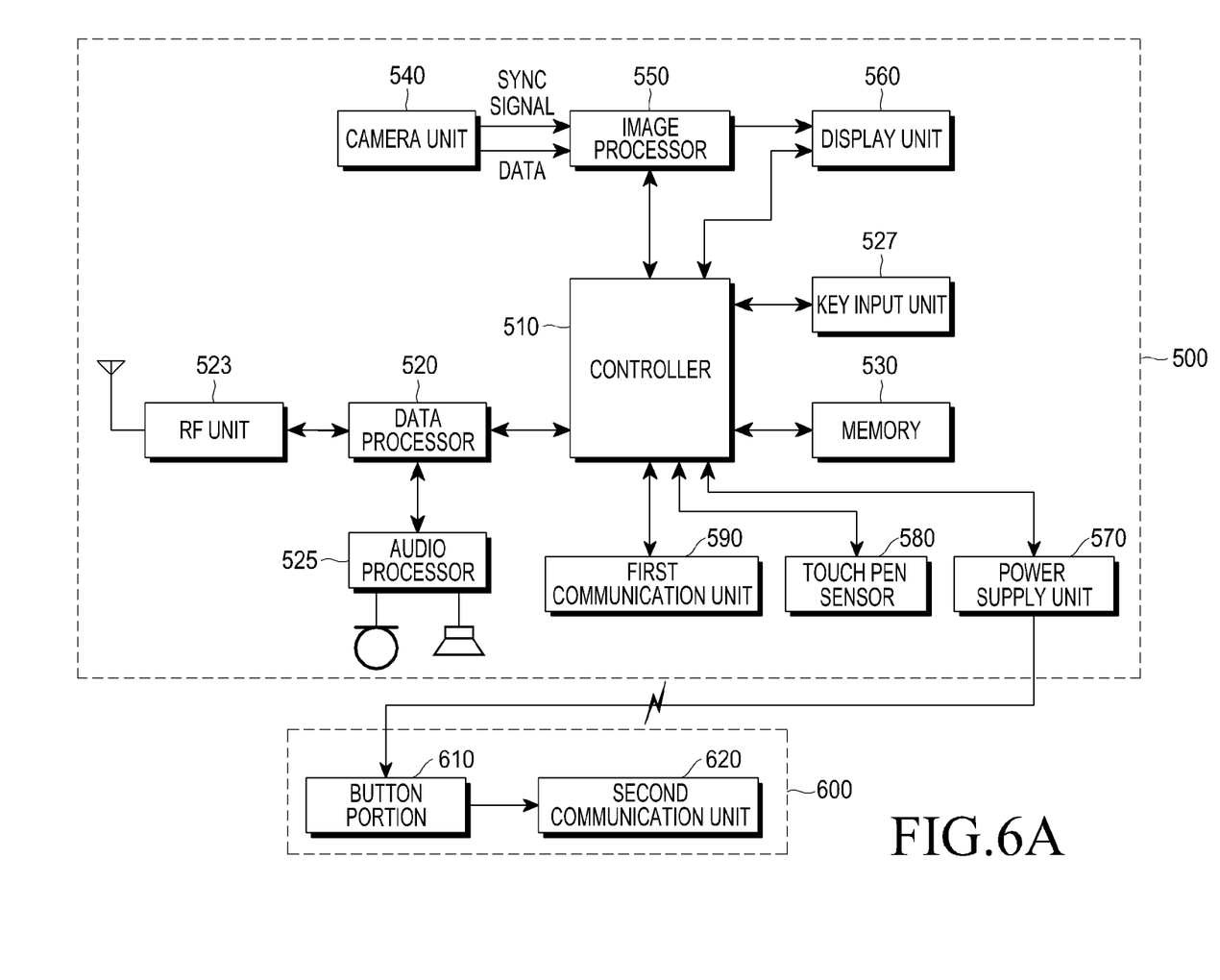
FIGS. 6A and 6B are block diagrams illustrating an electronic device having a touch pen mounted thereon according to an embodiment of the present disclosure.
Figure 6B:
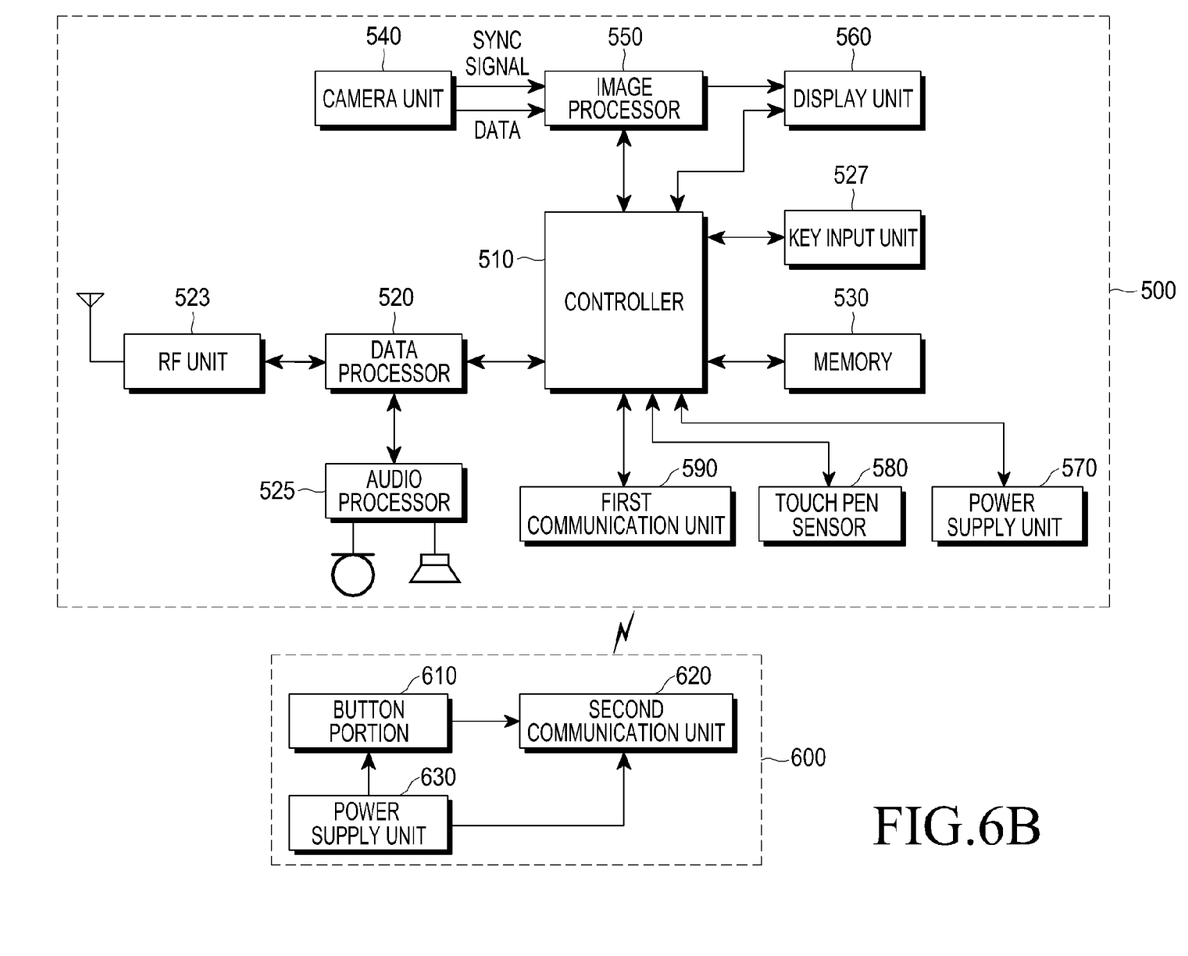

FIGS. 6A and 6B are block diagrams illustrating an electronic device having a touch pen mounted thereon according to an embodiment of the present disclosure. For example, FIGS. 6A and 6B illustrate an electronic device and an input device according to an embodiment of the present disclosure. FIG. 6A illustrates the electronic device 500 and the touch pen 600 having no power supply unit.

Referring to FIG. 6A, the electronic device 500 may include a controller 510, a data processor 520, an RF unit 523, an audio processor 525, a key input unit 527, a memory 530, a camera unit 540, an image processor 550, a display unit 560, a power supply unit 570, a touch pen sensor 580, and a first communication unit 590.

The RF unit 523, the data processor 520, the audio processor 525, the key input unit 527, the memory 530, the camera unit 540, the image processor 550, the display unit 560, the power supply unit 570, and the touch pen sensor 580 are the same as those shown in FIG. 2A and thus will not be described herein.

The controller 510 performs a function of controlling an overall operation of the electronic device 500. According to various embodiments of the present disclosure, upon the touch pen 600 being mounted on the electronic device 500, the button portion 610 provided on the touch pen 600 is set as a button of the electronic device 500. Upon receiving the button input signal of the touch pen 600 through a first communication unit 590 communication-connected with a second communication unit 620 of the touch pen 600, the controller 510 performs a function corresponding to the button input signal. According to various embodiments of the present disclosure, upon receiving a mounting sensing signal indicating mounting of the touch pen 600 from the touch pen sensor 580, the controller 510 activates the first communication unit 590.

If the touch pen 600 is mounted on the electronic device 500, then the first communication unit 590 is connected with the second communication unit 620 of the touch pen 600. The first communication unit 590 transmits a button input signal received from the second communication unit 620 of the touch pen 600 to the controller 510.

The touch pen 600 may include the button portion 610 and the second communication unit 620.

The button portion 610 is the same as the button portion 210 of the touch pen 200 illustrated in FIG. 2A and thus will not be described herein.

When the touch pen 600 is mounted on the electronic device 500, the second communication unit 620 is communication-connected with the first communication unit 590 of the electronic device 500. The second communication unit 620 is connected with the button portion 610, and transmits the button input signal received from the button portion 610 to the first communication unit 590 of the electronic device 500.

FIG. 6B illustrates the electronic device 500 and the touch pen 200 that has a power supply unit capable of supplying power to the touch pen 200.

Referring to FIG. 6B, the electronic device 500 may include the controller 510, the data processor 520, the audio processor 525, the key input unit 527, the RF unit 523, the memory 530, the camera unit 540, the image processor 550, the display unit 560, the power supply unit 570, the touch pen sensor 580, and the first communication unit 590.

The RF unit 523, the data processor 520, the audio processor 525, the key input unit 527, the memory 530, the camera unit 540, the image processor 550, the display unit 560, the touch pen sensor 580, and the first communication unit 590 are the same as those of the electronic device 100 illustrated in FIG. 6A and thus will not be described herein.

The controller 510 performs a function of controlling an overall operation of the electronic device 500. According to various embodiments of the present disclosure, upon the touch pen 600 being mounted on the electronic device 500, the controller 510 sets the button portion 610 provided on the touch pen 600 as a button of the electronic device 500. Upon receiving the button input signal of the touch pen 600 through the first communication unit 590 communication-connected with the second communication unit 620 of the touch pen 600, the controller 510 performs a function corresponding to the button input signal.

The power supply unit 570 supplies power to the components of the electronic device 500.

The touch pen 600 may include the button portion 610, the second communication unit 620, and the power supply unit 630. The button portion 610 and the second communication unit 620 are the same as those of the touch pen 600 illustrated in FIG. 6A and thus will not be described herein.

The power supply unit 630 is provided on the touch pen 200, such that the power supply unit 630 is charged with power through a charging device to be connected with the touch pen 200 and supplies the charged power to the button portion 610 of the touch pen 600. The button portion 610 may include circuits as illustrated in FIGS. 3A and 3B, and the power supply unit 630 of the touch pen 600 supplies current to the button portion 610 through the VCC. The power supply unit 630 supplies power to the button portion 610 regardless of mounting or separation of the touch pen 600 on or from the electronic device 500. When the touch pen 600 is mounted on the electronic device 500, the power supply unit 630 may supply power to the button portion 610 under control of the controller 510 of the electronic device 500.

An operation of using the button portion 610 of the touch pen 600 in the electronic device 500 as a button of the electronic device 500 by using the electronic device 500 and the touch pen 600 illustrated in FIGS. 6A and 6B will be described in detail with reference to FIG. 7.

Figure 7:
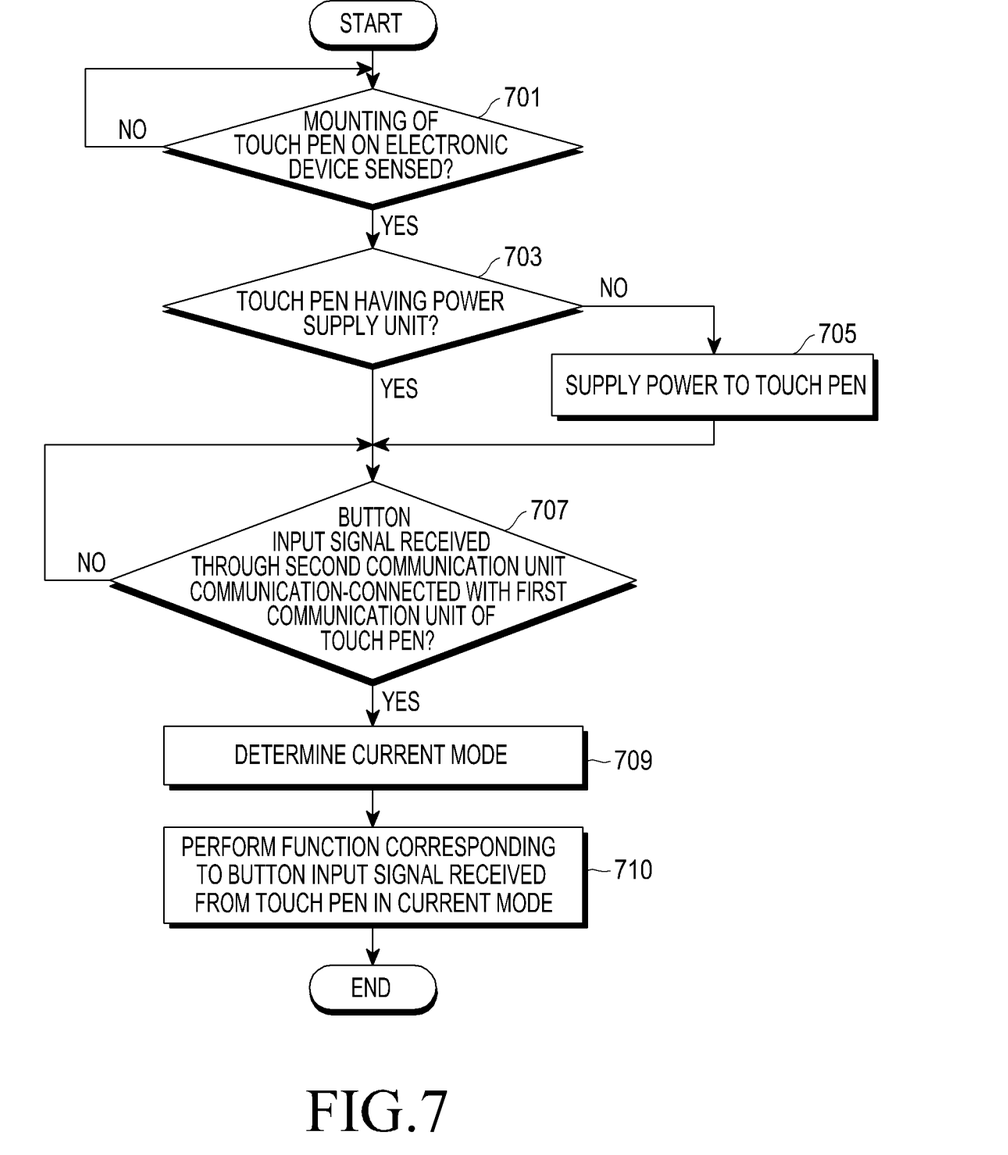
FIG. 7 is a flowchart illustrating an operation of using a button portion of a touch pen in an electronic device as a button of the electronic device according to an embodiment of the present disclosure.

FIG. 7 is a flowchart illustrating an operation of using a button portion of a touch pen in an electronic device as a button of the electronic device according to an embodiment of the present disclosure.

Referring to FIG. 7, at operation 701, the electronic device 500 determines whether a mounting of the touch pen 600 is detected. For example, if the touch pen 600 is mounted on the electronic device 500, then the touch pen sensor 580 detects mounting of the touch pen 600 and transmits a mounting sensing signal indicating mounting of the touch pen 600 to the controller 510. Upon receiving the mounting sensing signal from the touch pen sensor 580, the controller 110 detects mounting of the touch pen 600 on the electronic device 500.

If the electronic device 500 determines that the mounting of the touch pen 600 is not detected at operation 701, then the electronic device 500 may poll for an indication that the touch pen 600 is mounted to the electronic device 500.

In contrast, if the electronic device 500 determines that the mounting of the touch pen 600 is detected at operation 701, then the electronic device 500 may proceed to operation 703 at which the controller 510 determines whether the touch pen 600 mounted on the electronic device 500 includes a power supply unit. According to various embodiments of the present disclosure, the electronic device 500 may determine whether a mounted touch pen 600 includes a power supply unit according to a power value detected in response to the touch pen 600 being mounted to the electronic device 500. According to various embodiments of the present disclosure, if the touch pen 600 having the power supply unit is mounted on the electronic device 500, then the touch pen sensor 580 of the electronic device 500 receives a particular power value from the power supply unit of the touch pen 600. Thus, the touch pen sensor 580 may transmit to the controller 510, a mounting sensing signal that is different from that transmitted when the touch pen 600 having no power supply unit is mounted on the electronic device 500.

If the electronic device 500 (e.g., the controller 510) determines that the touch pen 600 mounted on the electronic device 500 does not include a power supply unit at operation 703, then the electronic device 500 may proceed to operation 705 at which the electronic device 500 may supply power to the touch pen 600. For example, if the electronic device 500 receives a first mounting sensing signal indicating that the touch pen 600 mounted on the electronic device 500 does not include the power supply unit as illustrated in FIG. at in operation 703, the controller 510 supplies power to the button portion 610 and the second communication unit 620 of the touch pen 600 through the power supply unit 570 at operation 705. Thereafter, the electronic device may proceed to operation 707. At operation 707, the controller 510 waits for receiving a button input signal from the touch pen 600.

If the electronic device 500 (e.g., the controller 510) determines that the touch pen 600 mounted on the electronic device 500 includes a power supply unit at operation 703, then the electronic device 500 may proceed to operation 707 at which the controller 510 waits for receiving a button input signal from the touch pen 600. For example, if the electronic device 500 (e.g., the controller 510) receives a second mounting sensing signal indicating that the touch pen 600 mounted on the electronic device 500 has a power supply unit as illustrated in FIG. 6B and thus is supplied with power therein at operation 703, then the controller 510 waits for receiving the button input signal from the touch pen 600 at operation 707.

Upon the touch pen 600 being mounted on the electronic device 500, the controller 510 activates the first communication unit 590 to control the first communication unit 590 to be communication-connected with the second communication unit 620 of the touch pen 600.

At operation 707, the electronic device 500 determines whether a button input signal is received from the touch pen 600. For example, the electronic device 500 determines whether a button input signal is received through a first communication unit 590 of the electronic device 500 that is connected with a second communication unit 620 of the touch pen 600.

According to various embodiments of the present disclosure, if the button portion 610 of the touch pen 600 having been mounted on the electronic device 500 is input by the user, then the button portion 610 generates a button input signal which is then transmitted to the first communication unit 590 through the second communication unit 620. The first communication unit 590 of the electronic device 500 having received the button input signal from the second communication unit 620 of the touch pen 600 transmits the button input signal to the controller 510.

If the electronic device 500 determines that a button input signal is not received from the touch pen 600 at operation 707, then the electronic device 500 may continue to poll for reception of a button input signal. For example, if the controller 510 determines that a button input signal is not received from the first communication unit 590 at operation 707, then the controller 510 may continue to poll for reception of a button input signal.

If the electronic device 500 determines that a button input signal is received from the touch pen 600 at operation 707, then the electronic device 500 may proceed to operation 709 at which the electronic device 100 determines a current mode. For example, if receiving the button input signal from the first communication unit 590 at operation 707, then the electronic device 500 may proceed to operation 709 at which the controller 510 determines a current mode of the electronic device 500.

At operation 710, the electronic device 500 performs a function corresponding to the button input signal received from the touch pen 600 in the current mode. For example, at operation 710, the controller 510 detects and determines a function corresponding to the button input signal, which has been preset for the current mode of the electronic device 500, from the memory 330. At operation 710, the controller 510 may perform a function corresponding to the detected button input signal.

The electronic device, the input device, and the method for controlling the electronic device by using the input device according to various embodiments of the present disclosure can be embodied as a computer-readable code on a non-transitory computer-readable recording medium. The non-transitory computer-readable recording medium is any data storage device that can store data which can be thereafter read by a computer system. Examples of non-transitory computer-readable recording media include Read-Only Memory (ROM), Random-Access Memory (RAM), optical disks, magnetic tapes, floppy disks, hard disks, non-volatile memories, etc., and carrier waves (e.g., transmission through the Internet). The non-transitory computer-readable recording medium can also be distributed over network-coupled computer systems so that the non-transitory computer-readable code is stored and executed in a decentralized fashion.

The electronic device, the input device, and the method for controlling the electronic device by using the input device according to various embodiments of the present disclosure may conveniently control the electronic device by using the input device having been mounted on the electronic device.

Other effects that may be obtained or expected from the embodiment of the present disclosure are explicitly or implicitly disclosed in the detailed description of the embodiment of the present disclosure. For example, various effects expected from the embodiment of the present disclosure have been disclosed in the detailed description of the present disclosure.

While the present disclosure has been shown and described with reference to various embodiments thereof, it will understand by those skilled in the art that various changes in form and details may be made therein without departing from the spirit and scope of the present disclosure as defined by the appended claims and their equivalents.

What is claimed is:

1. An electronic device comprising:
    an input device sensor configured to detect insertion of an input device in the electronic device;
    a reception unit configured to receive a button input signal received from the input device inserted in the electronic device; and
    a controller configured to:
        set a button portion provided in the input device as a button of the electronic device in response to detecting insertion of the input device in the electronic device, and
        perform a function corresponding to the button input signal when the button input signal of the input device is received from the reception unit.

2. The electronic device of claim 1,
    wherein the reception unit comprises a reception terminal that is connected with a transmission terminal of the input device inserted in the electronic device, and
    wherein the reception unit is configured to transmit the button input signal received from the transmission terminal to the controller.

3. The electronic device of claim 1,
    wherein the reception unit comprises a first communication unit that is communication-connected with a second communication unit of the input device inserted in the electronic device, and
    wherein the reception unit is configured to transmit a button input signal received from the second communication unit to the controller.

4. The electronic device of claim 1, wherein the controller is further configured to:
    determine whether the input device inserted in the electronic device comprises a power supply unit, and
    supply power to the input device through a power supply unit of the electronic device when the controller determines that the input device does not comprise the power supply unit.

5. The electronic device of claim 4, wherein the controller is further configured to determine whether the input device comprises the power supply unit according to a sensing signal transmitted to the controller in response to detecting insertion of the input device to the electronic device.

6. The electronic device of claim 4, wherein when the reception unit comprises a reception terminal, the controller is further configured to supply power to a button portion of the input device through the power supply unit of the electronic device, when the input device does not comprise the power supply unit.

7. The electronic device of claim 4, wherein the reception unit comprises a first communication unit, the controller is further configured to supply power to a button portion and a second communication unit of the input device through the power supply unit of the electronic device, when the input device does not comprise the power supply unit.

8. The electronic device of claim 1, wherein the controller is further configured to:
    determine a current mode of the electronic device when the button input signal is received,
    determine a function corresponding to the button input signal, which is preset for the current mode of the electronic device, and
    perform a function corresponding to the button input signal.

9. An input device comprising:
    a button portion configured to be set and used as a button of an electronic device when the input device is inserted in the electronic device; and
    a transmission unit configured to transmit a button input signal received from the button portion to the electronic device when the input device is inserted in the electronic device.

10. The input device of claim 9, wherein the button portion is provided in an end portion of the input device at which the input device is exposed when the input device is inserted in the electronic device.

11. The input device of claim 9, wherein the transmission unit comprises a transmission terminal that is connected with a reception terminal of the electronic device and transmits the button input signal received from the button portion to the reception terminal of the electronic device, when the input device is inserted in the electronic device.

12. The input device of claim 9, wherein the transmission unit comprises a second communication unit that is connected with a first communication unit of the electronic device and transmits the button input signal received from the button portion to the first communication unit of the electronic device, when the input device is inserted in the electronic device.

13. The input device of claim 9, wherein, when the transmission unit comprises a transmission terminal and the input device comprises a power supply unit, power is supplied to the button portion through the power supply unit of the input device.

14. The input device of claim 9, wherein, when the transmission unit comprises a second communication unit and the input device comprises a power supply unit, power is supplied to the button portion and the second communication unit of the input device through the power supply unit of the input device.

15. A method for controlling an electronic device using an input device, the method comprising:
    setting a button portion provided in the input device as a button of the electronic device in response to detecting insertion of the input device on the electronic device; and
    performing a function corresponding to a button input signal, upon receiving the button input signal from the input device.

16. The method of claim 15, wherein the receiving of the button input signal comprises:
    connecting a reception terminal of the electronic device with a transmission terminal of the input device, when the input device is inserted in the electronic device;
    generating a button input signal, when the button portion of the input device is inserted in the electronic device is input; and
    transmitting the button input signal to the reception terminal of the electronic device through the transmission terminal of the input device.

17. The method of claim 16, further comprising:
    supplying power to the button portion of the input device when the input device is inserted in the electronic device.

18. The method of claim 15, wherein the receiving of the button input signal comprises:
    connecting a first communication unit of the electronic device to a second communication unit of the input device when the input device is inserted in the electronic device;
    generating a button input signal when the button portion of the input device is inserted in the electronic device is input; and
    transmitting the button input signal to the first communication unit of the electronic device through the second communication unit of the input device.

19. The method of claim 18, further comprising:
    supplying power to the button portion and the second communication unit of the input device when the input device is inserted in the electronic device.

20. The method of claim 15, wherein the performing of the function comprises:
    determining a current mode of the electronic device upon receiving the button input signal;
    determining a function corresponding to the button input signal, which is preset for the current mode of the electronic device; and
    performing the function corresponding to the button input signal.

\* \* \* \* \*